United States Patent [19]
Berman

[11] 4,313,652
[45] Feb. 2, 1982

[54] METHOD AND APPARATUS FOR EYEGLASS LENS ADJUSTMENT AND RETENTION

[76] Inventor: Marvin Berman, 24955 Bob Batchelor Rd., Calabasas, Calif. 91302

[21] Appl. No.: 70,562

[22] Filed: Aug. 29, 1979

[51] Int. Cl.³ .................. G03B 41/02; G03B 41/06
[52] U.S. Cl. .................................. 351/106; 351/107; 351/152
[58] Field of Search ............... 351/106, 107, 57, 58, 351/47, 152; 2/441, 432, 442, 12, 443, 444

[56] References Cited

U.S. PATENT DOCUMENTS

| 797,163 | 8/1905 | Winslow | 351/135 |
| 2,384,867 | 9/1945 | Williams | 351/106 |

FOREIGN PATENT DOCUMENTS

| 1227691 | 10/1966 | Fed. Rep. of Germany | 351/107 |
| 1188346 | 3/1959 | France | 351/106 |
| 1190428 | 10/1959 | France | 351/106 |
| 462113 | 2/1951 | Italy | 351/106 |

Primary Examiner—John K. Corbin
Assistant Examiner—Rodney Bovernick
Attorney, Agent, or Firm—Nilsson, Robbins, Dalgarn, Berliner, Carson & Wurst

[57] ABSTRACT

A method and apparatus for eyeglass adjustment and retention wherein two lens supporting members form a locking cavity between them and are tightened together over a grooved portion at the top of the lens, tightly retaining the lens against lateral movement without touching the sides of the lens, and are adjustable for easily readjusting the lateral position of the lens on the eyeglass frame for fitting special purpose lens to a wearer when lateral position is crucial to the proper functioning of the lens.

18 Claims, 8 Drawing Figures

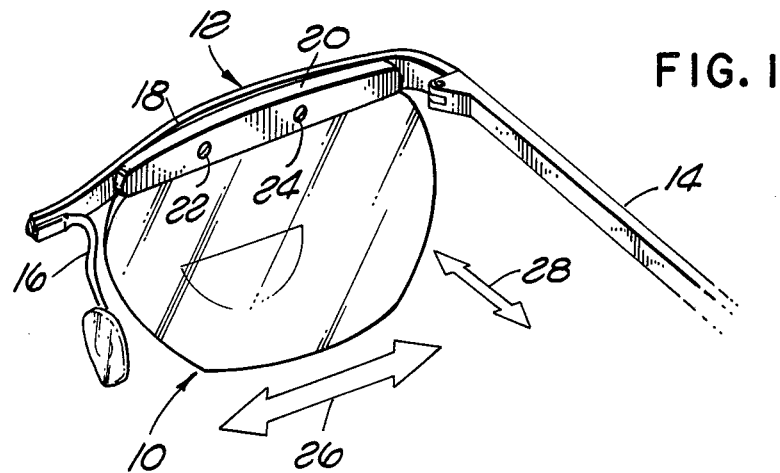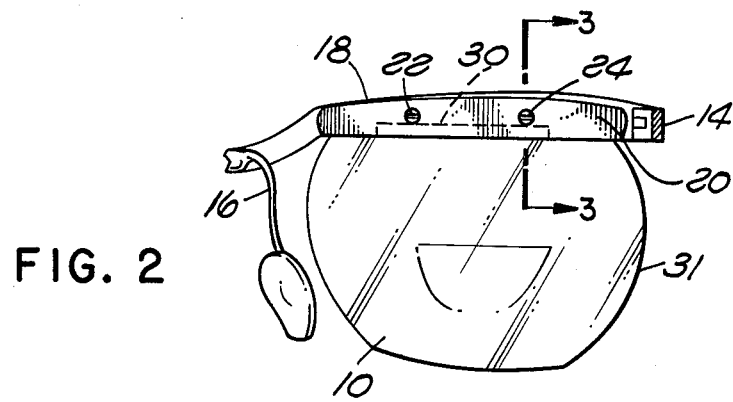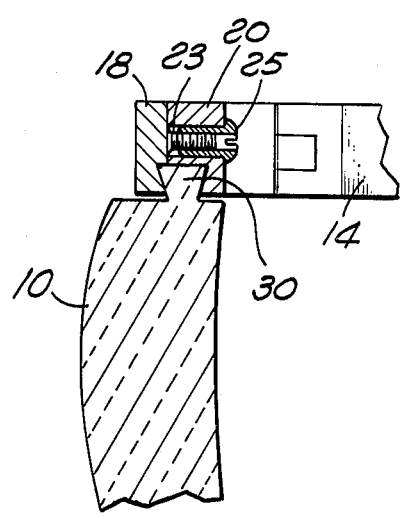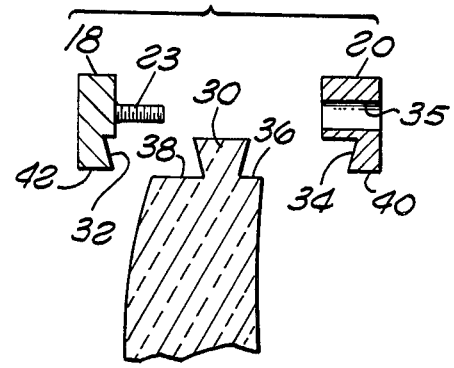

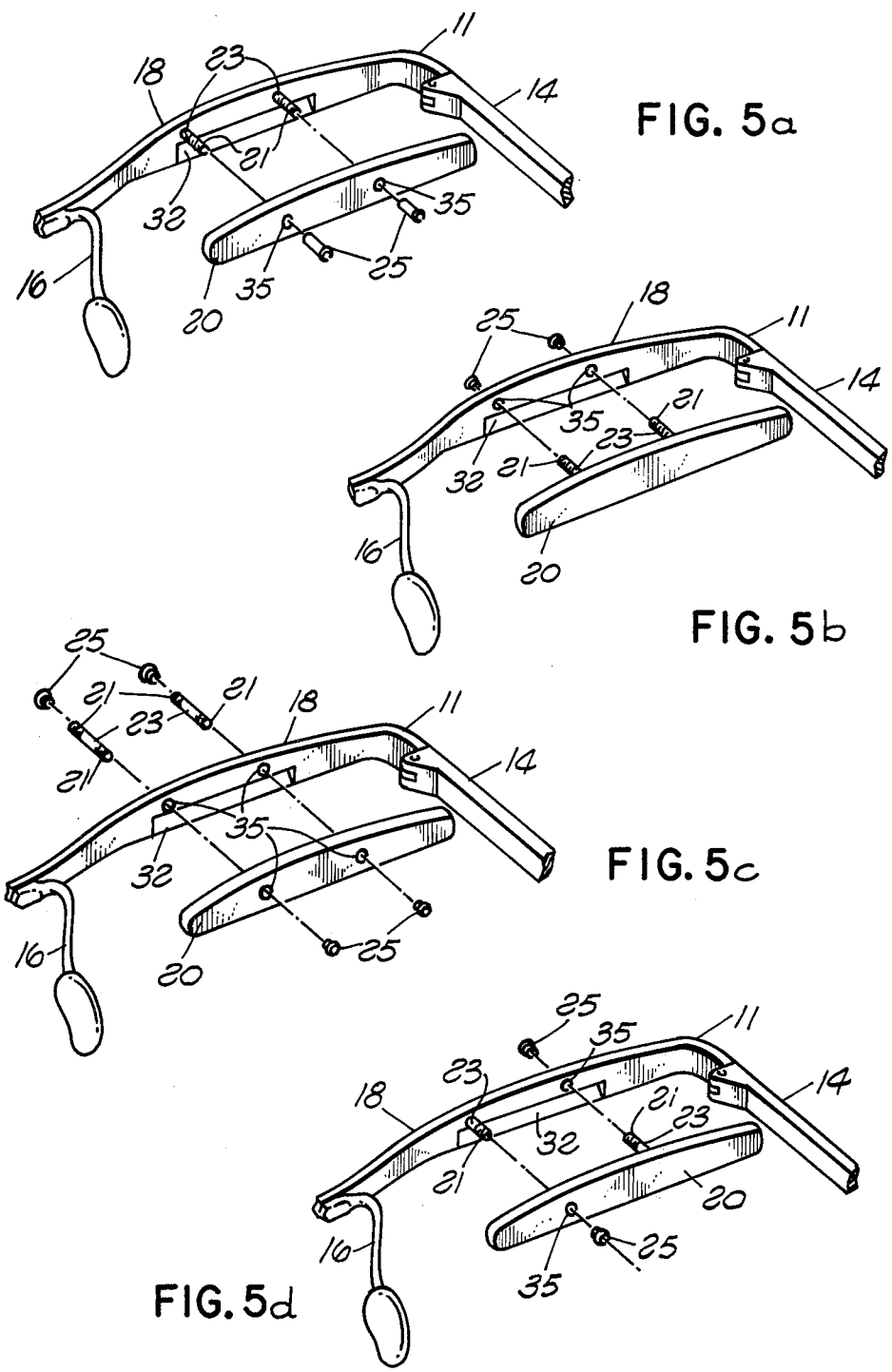

METHOD AND APPARATUS FOR EYEGLASS LENS ADJUSTMENT AND RETENTION

BACKGROUND OF THE INVENTION

This invention relates generally to a novel method and apparatus for adjusting the lateral position of special purpose lenses on eyeglasses and fixing the lenses, once so adjusted, against undesired lateral motion of the lenses with respect to the eyeglass frame.

In the prior art there have been basically four different means by which lenses have been secured to frames for eyeglasses. First it has been common to cement the lens to a portion of the frame. A second common method has been to pin the lens directly to the frame, for example, as is done with rimless eye glasses. A third common method has been to form a ridge, as by grinding, around at least a portion of the periphery of the lens and to fit that ridge into a female groove in the eyeglass frame or into a female grooved member which fits over the frame and the ridge of the lens. Finally, it is known to provide a female groove around the periphery of the lens and insert a wire-like member therein which forms a part of the frame.

Each of the above methods perform quite well under some specific applications for the wearers of eye glasses. However, with respect, e.g., to cataract lens wearers, there are some very unique and specific requirements. A cataract lens must be adjustable with respect to the supporting system formed by the eyeglass frame and the lens supporting members to permit positioning of the lens so that the center of the lens is directly over the pupil of the wearer. Lateral displacement of the lens which varies the optical center from its desired position with respect to the frame, as little as 0.5 mm can have an effect on the vision of the wearer and more significant displacements rapidly deteriorate the effectiveness of the cataract lens causing improper vision and eye strain of the wearer. Therefore, once properly positioned, the lens must also be securely affixed to the frame in such a manner that it will not move, particularly laterally.

The outer periphery of the cataract lens must be as near a knife edge as possible, and there must be no optical obstruction along that knife edge. That is, the frame cannot extend around the outer periphery of the lens along the knife edge. If there is any obstruction along the knife edge, it causes extreme interference with the vision of the wearer.

Finally, the temple piece must be as far removed from the line of vision as possible.

Each of the lens systems in the prior art possess some of the features required for a cataract lens wearer or wearer of other lenses requiring fitting to the wearer. None of them have all of the features. The lens attaching methods and apparatus of the prior art leave significant room for improvement when it comes to fixing a lens to the eyeglass frame and preventing any lateral movement whatever, while still allowing easy adjustment of the lens position for a particular wearer prior to fixing its final position.

The patents to Gitlin et al., U.S. Pat. Nos. 3,565,517, Feb. 23, 1971 and 3,475,083, Oct. 28, 1969, and to Stolper, 3,017,806, Jan. 23, 1962, and the French Pat. No. 1,347,120, Nov. 18, 1963, show a form of a locking cavity contained in a portion of lens-holding part of the eyeglass frame or formed between two detachable parts of the eyeglass frame. They do not show an attaching method and apparatus in which the lateral position of the lens with respect to the frame is adjustable to fit the needed lens position for a specific wearer of the glasses, which is required for certain special purpose lenses, e.g., cataract lenses.

In addition, Stolper shows a portion of the attaching means extending along the outer periphery of the lens, which is not suitable for cataract lenses. Further, in the magnetic lens holding means shown in the Gitlin et al. patents, the magnet is not sufficient to provide positive prohibition of lateral motion with respect to the frame, so that, even if the Gitlin et al. patent disclosures were expanded beyond their teaching to provide that the flange on the lens support member was shorter than the groove in the frame, thus allowing lateral adjustment during fitting, the lens would not be positively held against lateral motion by the magnet holding means.

The lens holding means shown in the patent to Bernheim, U.S. Pat. No. 2,529,068, Nov. 7, 1950 suffers from the same defects of not providing for lateral adjustability during fitting and extension of the holding means along a portion of the outer periphery of the lens. It is also readily apparent that the means for holding the lenses in the goggles discussed in the patent to Peloquin, U.S. Pat. No. 1,573,088, Feb. 16, 1926, is totally incapable of achieving the desired results of the present invention.

Lenses having a generally keystone shaped portion which fits into a grooved portion on the eyeglass frame or a grooved portion of a plastic member which fits over the frame and keystone are known as is shown, e.g., in the patents to Williams, U.S. Pat. Nos. 2,091,296, Aug. 31, 1937; 2,198,852, Apr. 30, 1940; and 2,384,867, Sept. 18, 1945.

These patents disclose a lens holding device in which the lens is prevented from lateral movement either by being cemented in the groove or by having a metal or plastic extension of the groove which extends beyond the end of the keystone of the lens and which is either bent over or heat formed around the end of the keystone to prevent lateral motion.

There is no suggestion in any of the Williams' patents noted above of adjusting the position at which the metal or plastic extension of the groove is bent or heat formed in order to vary the lateral position of the optical center of the lens according to the specific "fit" of a wearer of special purpose lenses, e.g., cataract lenses. There is also no suggestion of the keystone having a length less than the length of the groove on the lens frame or plastic member in order to allow lateral adjustment to a specific wearer. In addition, cementing the lens in the grove creates problems in adjusting the lens to a specific wearer, as discussed below with respect to another method and apparatus used in the prior art.

A method of attaching special purpose lenses and adjusting them to a special wearer presently in use employs a strip of material having one side of a thermosetting adhesive material and another side of a thermoplastic adhesive. See the patent to Blair, U.S. Pat. No. 3,639,044, Feb. 1, 1972. The thermosetting side is placed adjacent the eyeglass frame in the general location desired for the lens and the thermoplastic adhesive abuts the lens itself. In use, the lens is attached to the thermoplastic part of the strips after heating the strips and attaching the strips to the eyeglass frame. Further heating of the thermosetting side increases the bond between that side and the frame. Once the lens is attached to the thermoplastic side the fit can be checked and, if necessary, the strip reheated to release the bond on the thermoplastic side for adjustment of the len's lateral position. This procedure is repeated as often as necessary to obtain a proper fit.

However, proper fitting in this manner is time-consuming and requires removal of the glasses from the patient's head and the lens from the frame of the glasses in order to reheat the adhesive strips and replace the lens in a new position. This makes reference to the prior position of the lens very difficult for purposes of gauging the desired new location for the lens to achieve proper fit. Once the lens is removed for adjustment it is very difficult to manually adjust the len's lateral position precisely prior to the lens contacting and being again adhesively bound by the thermoplastic side of the strip. This often leads to the need to repeat the adjusting process several times for each lens, resulting in higher cost to the patient for the doctor's or technician's time in making these adjustments, and may decrease the efficiency of the eventual bond of the lens to the frame by the thermoadhesive strips. See also the patent to Lissac, U.S. Pat. No. 3,243,249, Mar. 29, 1966, which discloses securing the lenses to the frame by adhesive coating on a resilient strip.

The problems enumerated in the foregoing paragraphs are not intended to be exhaustive but rather are among many which tend to impair the effectiveness of previously known methods and apparatus for attaching and adjusting lenses, particularly those where the lateral position of the lens is crucial to proper functioning, to the eyeglass frame. Other noteworthy problems may also exist, however, those presented should be sufficient to demonstrate that methods and apparatus for adjusting the lateral position of the lens on the eyeglass frame and positively preventing undesired lateral motion with respect to the frame, after such adjustment, while also facilitating adjustment during the fitting of the lens to the particular wearer appearing in the art have not been altogether satisfactory.

SUMMARY OF A PREFERRED EMBODIMENT OF THE INVENTION

Recognizing the need for an improved method and apparatus for adjusting the lateral position of a special purpose lens on an eyeglass frame for a particular wearer and for positively preventing lateral motion of the lens with respect to the frame once such adjustment is completed, it is therefore, a general feature of the present invention to provide a novel method and apparatus for adjusting the lens to and holding the lens on the eyeglass frame, which minimizes or reduces the problems noted above.

It is a more particular feature of the present invention to provide a lens supporting member fixedly attached to the eyeglass frame and having a grooved section. A second lens supporting member, also having a grooved portion, which defines a locking cavity with the groove portion on the fixedly attached supporting member, is tightly bound to the fixedly attached supporting member by a plurality of binding elements extending through at least one of the supporting members. A male grooved portion ground in the lens, of generally the same shape as the locking cavity, is tightly held within the cavity as the supporting members are bound tightly together by the binding elements.

It is another feature of the present invention that the binding elements are tightened by screwing down on a portion of the binding elements passing through at least one of the supporting members to allow loosening to adjust the lateral position of the lens and to provide positive prevention of lateral motion once the lens supporting members are tightly screwed together.

These and/or other features and advantages of the present invention will become apparent with reference to the following description of a preferred embodiment of the invention in connection with the accompanying drawings, wherein like reference numerals refer to like elements in each Figure, and in which:

BRIEF DESCRIPTION OF THE DRAWINGS

FIG. 1 is a perspective view of one half of a pair of eyeglasses containing the lens supporting means of the present invention;

FIG. 2 depicts a front elevational view of one half of a pair of eyeglasses containing the lens supporting means of the present invention;

FIG. 3 is a sectional view of the present invention along lines 3—3 of FIG. 2;

FIG. 4 is an exploded view of a portion of FIG. 3; and

FIG. 5(a)–5(d) show exploded views of alternative embodiments for arrangement of the binding elements according to the present invention.

DETAILED DESCRIPTION OF A PREFERRED EMBODIMENT OF THE INVENTION

Turning first to FIG. 1, it is there shown that a lens 10 is supported in a holder 12. The lens holder 12 shown is in a right-eye portion of the eyeglasses, of which only one-half is shown in FIG. 1 and the right-eye portion is also secured, as is well known in the art, to an earpiece 14 and a nose-ridge 16 to which is attached an additional lens holder and earpiece (not shown). The lens holder 12 is composed of a pair of lens supporting members 18 and 20 which are secured and tightly bound together by appropriate binding elements (e.g., threaded studs 23 and nuts 25 which fit thereon) shown schematically at 22 and 24 in FIG. 1.

When secured in place within the holder 12, the lens 10 may first be adjusted laterally as indicated by the double arrow 26 to fit the wearer's eyes precisely. Once properly laterally adjusted, the binding elements 22, 24 are tightened down thus tightly clamping the lens 10 into the holder 12 such that it cannot thereafter move. The holder 12 is conveniently constructed of sufficient mass in the lens supporting elements 18, 20 of the holder 12 that it will support the lens 10 very rigidly and prevent it from vibrating during normal wear and, thus, moving in the fore and aft direction as illustrated by the arrow 28.

Turning now to FIG. 2, the outer periphery 31 of certain special purpose lenses, e.g., cataract lenses 10 must be completely unobstructed in order to function properly. This is accomplished with the retaining system of the present invention. This outer periphery 31 is formed as a knife edge in cataract lenses to provide the correct vision for the wearer.

It will be seen in FIG. 2 that the two binding elements 22, 24 are positioned to apply binding pressure to tightly bind the lens supporting members 18, 20 together with the binding force exerted by screwing down on the binding elements 22, 24, each being located within the vertical upward extension of lines drawn from the opposite ends of a male grooved portion 30 of the lens 10, which will be described below.

Turning now to FIG. 3, it will be seen that the lens 10 is ground along the upper periphery thereof to provide a male grooved portion, e.g., keystone 30 in the form of a typical dovetail. The lens supporting member 18 is ground in such a way as to provide one-half of a keyway 32 to fit one side of the dovetail 30, while the other lens supporting member 20 is ground to provide the outer half 34 of a keyway to conform to the dovetail 30. When placed together, the half keyways 32, 34 form a locking cavity.

FIG. 4 shows the appropriate assembly of the lens holding system 12. The lens is placed so that the dovetail 30 fits within the half keyway 32 in the first lens supporting member 18. The second lens supporting member 20 is then placed so that the dovetail 30 fits within its half keyway 34, and the second lens separating member 20 has corresponding holes 35 which fit onto each of a plurality of threaded studs 23 protruding from this first lens supporting member 18. Nuts 25 are then secured in place but not tightened fully. At this point, the lens 10 is then adjusted laterally to fit a particular wearer after which the nuts 25 are securely tightened with a suitable hand tool to thereby securely clamp the male grooved portion 30 of the lens 10 in place between the lens supporting members 18, 20.

As will be obvious to those skilled in the art, appropriate spacing is permitted in the formation of the locking cavity 32, 34 and the male grooved portion 30 so that there is sufficient room to permit adequate tightening of the lens supporting members 18, 20 against the lens 10 to secure it in place.

It will also be noted that shoulders 36, 38 provided on the lens against which the bottom portions 40, 42 of the lens supporting members 18, 20, respectively, rest to provide additional rigidity to the system and thereby hold the lens 10 securely in position.

FIGS. 5(a)-5(b) show alternative embodiments for the binding elements 22, 24 of the present invention. In FIG. 5(a) the studs 23 are formed integrally with the first lens supporting member 18 and have threaded ends 21. The second lens supporting member 20 has matching holes 35 through which the studs extend allowing nuts 35 to be placed on the studs 23 in order to tightly screw the first and second lens supporting members 18, 20 together.

FIGS. 5(b), (c) and (d) show alternative embodiments wherein, respectively, the studs 23 are integral with the second lens supporting member 20, the studs 23 are integral with neither and have threaded connections 21 at each end for attaching nuts 25, and at least one of the studs 23 is integral with each of the first lens supporting member 18 and the second lens supporting member 20. In the embodiment shown in FIG. 5(c), the nut 25 on one end of each of the studs 23 could be replaced by a stop member consisting of, e.g., a flange integrally formed on the end of the stud 23 such that when the nut 25 on the other end is tightened down the first and second lens supporting members 18, 20 will be tightly bound together.

As is shown in FIGS. 5(a)-5(d), the locking cavity formed by the grooved surfaces 32, 34 in the first and second lens supporting members 18, 20 need not extend for the full length of the lens supporting members 18, 20. It need only be longer than the length of the male grooved portion 30 of the lens 10, thus allowing freedom of lateral movement within the locking cavity 32, 34 with the binding elements 22, 24 loosened so that the lens can be fitted to the wearer by such lateral motion prior to tightening the binding elements 22, 24.

Although the invention as described has been specifically directed to cataract lenses, those skilled in the art will recognize that, so long as there is sufficient thickness to the lens 10 to accommodate the grinding of the keyway into the upper portion of the lens, the invention may be employed with any type of eyeglasses desired, where it is important to maintain the lateral position of the lens 10 and to be able to easily adjust the lateral position of the lens 10 to the wearer's eye. Alternatively, even though a lens 10 may not have sufficient thickness, the blank for the lens 10 can be formed in such a manner as to provide the additional material at the upper portion thereof to permit the grinding of the keystone 30 according to the present invention.

It will be appreciated that in employing the method and apparatus for adjusting the lateral position of the lens 10 of an eyeglass to a wearer's eye and then positively preventing the lens 10 from lateral movement according to the present invention, certain significant advantages are provided.

In particular the lens 10 can easily be adjusted laterally during fitting to the wearer while the glasses are on the wearer. This is done by loosening the binding elements 22, 24 and allowing the keystone 30 on the lens to slide within the locking cavity 32, 34. When the proper position is obtained, the lens 10 can then be secured tightly enough with simple finger pressure between thumb and forefinger pressing the first and second lens supporting members 18, 20 together until nuts 25 can be tightened down. This makes adjustment of the lateral lens position a simple and relatively quick process in comparison with prior art methods and apparatus.

Once the lens is tightly bound between the lens supporting members 18, 20 by tightening the nuts 25, the lens is positively held against lateral movement, and the shoulders 36, 38 on the lens, cooperating with the bottoms 40, 42 of the lens supporting members 18, 20 prevent fore and aft pivoting motion of the lens 10 with respect to the frame 11. Further, no portion of the lens supporting members 18, 20 extend along any part of the knife edge portion 31 of lens 10.

The foregoing description of the invention has been directed to a particular preferred embodiment in accordance with the requirements of the Patent Statutes and for purposes of explanation and illustration. It will be apparent, however, to those skilled in the art that many modifications and changes in both the apparatus and method of the present invention may be made without departing from the scope and spirit of the invention. For example, the paticular shape of the male grooved portion 30 and the binding cavity 32, 34 is not crucial so long as they are generally of the same shape so that tightening of the first and second lens supporting members 18, 20 together will tightly bind the lens 10 against lateral movement. In addition, either the binding cavity surfaces 32, 34 or the male grooved portion 30 of the lens 10, or both, may be texturized in order to frictionally assist in holding the lens 10 against lateral movement. One method of texturizing the keystone male grooved portion 30 is to run the mill saw used to grind the keystone 30 slowly thus leaving the surface of the keystone 30 rough.

Also, three or more binding elements 22, 24 may be employed, with at least one positioned within the vertical upward extension of the lines passing through the ends of the grooved male portion 30 of the lens 10.

In addition to the embodiments described for the location of the studs 23 and holes 35, it is also contemplated that in the embodiment described wherein the first lens supporting member 18 is not integral with the eyeglass frame, the studs 23 can be of such length to extend through the first and second lens supporting elements 18, 20 and the brow portion of the eyeglass frame 11, and the brow portion of the eyeglass frame 11 can have corresponding holes, such that the studs 23 and nuts 25 serve to tighten the first and second lens supporting elements 18, 20 together and attach them to the eyeglass frame 11.

Finally, the specific construction of the binding elements 22, 24 is not crucial to the present invention. Those skilled in the art will recognize that the studs 23 and nuts 25 described above can be replaced, e.g., with an internally threaded blind sleeve affixed to one lens support member 18 and into which is screwed a screw passing through and thus binding the other support member 20.

These and other modifications of the invention will be apparent to those skilled in the art. It is the Applicant's intention in the following claims to cover all such equivalent modifications and variations as fall within the true spirit and scope of the invention.

What is claimed is:

1. In a pair of eyeglasses, having a frame with a right eye portion and a left eye portion, in which the lateral position of each of a pair of lenses on the frame is crucial to proper vision of a wearer of the glasses, the improvement in the apparatus for mounting each lens and adjusting each lens to the proper lateral location for a specific wearer comprising:
   a first lens supporting member fixedly attached to the respective one of the right and left eye portions, said first lens supporting member having a first grooved section;
   a second lens supporting member having a second grooved section, said first and second grooved sections defining a locking cavity between said first lens supporting member and said second lens supporting member when said first lens supporting member and said second lens supporting member are tightly bound together, said locking cavity being closed except for a lens receiving opening when said lens supporting members are bound together;
   a plurality of binding elements extending through at least one of said first lens supporting member and said second lens supporting member and adapted to be tightened and loosened to tightly bind said first lens supporting member to said second lens supporting member; and a lens, having a top portion, and having a male grooved portion on said top portion, said male grooved portion having a straight top edge and being of the same shape as said locking cavity, said top portion of said lens having a length which is less than the length of said closed cavity, and adapted to be frictionally bound within said locking cavity against lateral movement when said first and second lens supporting members are tightly bound together and to be laterally moved within said locking cavity when said lens supporting members are loosened for adjustment of said lens with respect to said supporting member.

2. The apparatus of claim 1 wherein said first lens supporting member is integral with the respective one of the right and left eye portions of the frame.

3. The apparatus of claim 1 wherein said plurality of binding elements are integral with at least one of said first and second lens supporting members and extend through the corresponding other of said first and second lens supporting members.

4. The apparatus of claim 2 wherein said plurality of binding elements are integral with at least one of said first and second lens supporting members, and extend through the corresponding other of said first and second lens supporting members.

5. The apparatus of claim 1 wherein said plurality of binding elements extend through said first lens supporting member and said second lens supporting member.

6. The apparatus of claim 2 wherein said plurality of binding elements extend through said first lens supporting member and said second lens supporting member.

7. The apparatus of claim 1 wherein at least one of said plurality of binding elements is integral with said first lens supporting member and at least one of said plurality of binding elements is integral with said second lens supporting member.

8. The apparatus of claim 2 wherein at least one of said plurality of binding elements is integral with said first lens supporting member and at least one of said plurality of binding elements is integral with said second lens supporting member.

9. The apparatus of claim 3 wherein each of said plurality of binding elements comprises:
   a stud integrally formed in at least one of said first and second lens supporting members and having a threaded portion; and,
   a nut having a threaded portion adapted to be screwed onto the threaded portion on said stud.

10. The apparatus of claim 5 wherein each of said plurality of binding elements comprises:
    a stud having a first end and a second end, said first and second ends each having a threaded portion; and,
    first and second nuts each having a treaded portion adapted to be screwed onto the respective one of said first and second ends.

11. The apparatus of claim 5 wherein each of said plurality of binding elements comprises:
    a stud having a first and second end;
    a stop member attached to said first end;
    a threaded portion on said second end; and,
    a nut having a threaded portion adapted to be screwed onto said threaded portion on said stud.

12. The apparatus of claim 1 wherein:
    said lens has a curved outer periphery forming a knife edge of the lens; and,
    said first lens supporting member and said second lens supporting member do not touch said outer periphery forming said knife edge of said lens.

13. The apparatus of claim 4 wherein each of said plurality of binding elements comprises:
    a stud integrally formed in at least one of said first and second lens supporting members and having a threaded portion; and,
    a nut having a threaded portion adapted to be screwed onto the threaded portion on said stud.

14. The apparatus of claim 7 wherein each of said plurality of binding elements comprises:

a stud integrally formed in at least one of said first and second lens supporting members and having a threaded portion; and, a nut having a threaded portion adapted to be screwed onto the threaded portion on said stud.

15. The apparatus of claim 8 wherein each of said plurality of binding elements comprises:

a stud integrally formed in at least one of said first and second lens supporting members and having a threaded portion; and, a nut having a threaded portion adapted to be screwed onto the threaded portion on said stud.

16. The apparatus of claim 6 wherein each of said plurality of binding elements comprises:

a stud having a first end and a second end, said first and second ends each having a threaded portion; and, first and second nuts each having a threaded portion adapted to be screwed onto the respective one of said first and second ends.

17. The apparatus of claim 6 wherein each of said plurality of binding elements comprises:

a stud having a first and second end;

a stop member attached to said first end;

a threaded portion on said second end; and, a nut having a threaded portion adapted to be screwed onto said threaded portion on said stud.

18. A method for adjusting a lens on an eyeglass frame for purposes of fitting the lens to a specific wearer when the lateral position of the lens is crucial to proper vision of the wearer and for preventing lateral motion of the lens once so adjusted, comprising the steps of:

holding the lens on the frame by means of a locking cavity defined by supporting portions of the frame which are adjustably tightenable onto each other and which frictionally retain the lens between them against lateral motion by gripping a male grooved member on the lens when said supporting portions are tightened together;

checking the proper lateral positioning of the lens for proper vision of the wearer of the glasses;

when necessary to effect an adjustment of the lateral position of the lens, loosening said supporting portions sufficiently to allow said male grooved member to slide laterally within said binding cavity and adjusting the lateral position of the lens by so sliding the lens;

retightening said supporting portions together; and, repeating the checking, loosening, sliding and retightening steps until the proper adjustment of the lens to the wearer is achieved and then finally tightening said supporting portions together, thereby positively preventing subsequent lateral motion of the lens with respect to the frame.

* * * * *